United States Patent [19]

Ichinose

[11] Patent Number: 4,881,773

[45] Date of Patent: Nov. 21, 1989

[54] SUNROOF PANEL ASSEMBLY

[75] Inventor: Hisao Ichinose, Atsugi, Japan

[73] Assignee: Nissan Motor Co., Ltd., Japan

[21] Appl. No.: 235,165

[22] Filed: Aug. 23, 1988

[30] Foreign Application Priority Data

Aug. 28, 1987 [JP] Japan .................... 62-130971[U]

[51] Int. Cl.⁴ ................................ B60J 7/11
[52] U.S. Cl. .................................. 296/216; 296/218; 296/901; 296/201; 156/91; 156/108; 52/573
[58] Field of Search ............... 296/201, 216, 218, 901; 156/91, 108; 52/573

[56] References Cited

U.S. PATENT DOCUMENTS

| 4,121,870 | 10/1978 | Oakey | 296/218 X |
| 4,765,676 | 8/1988 | Grimm et al. | 296/216 |
| 4,826,239 | 5/1989 | Nishikawa et al. | 296/218 |

FOREIGN PATENT DOCUMENTS 139915 3/1979 Japan .

2175634 12/1986 United Kingdom ............... 296/201

Primary Examiner—Dennis H. Pedder
Attorney, Agent, or Firm—Leydig, Voit & Mayer

[57] ABSTRACT

A sunroof panel assembly comprises a sunroof panel made of a synthetic resinous material and a frame made of a thin steel sheet and covering the outer peripheral portion of the sunroof panel. The frame is bonded, at at least part of the inner peripheral edge portion provided with a welt, to the sunroof panel by a curable adhesive. The outer peripheral edge portion of the frame and the outer peripheral portion of the sunroof panel are laid one upon the other and at least partly held tightly together by a molding in such a way that the inner peripheral edge portion of the frame and the outer peripheral portion of the sunroof panel are slidingly movable relative to each other when there is a thermal expansion or contraction differential between the frame and the sunroof panel. The frame is also bonded at a portion between the inner and outer peripheral edge portions to the sunroof panel by a non-curable adhesive.

12 Claims, 3 Drawing Sheets

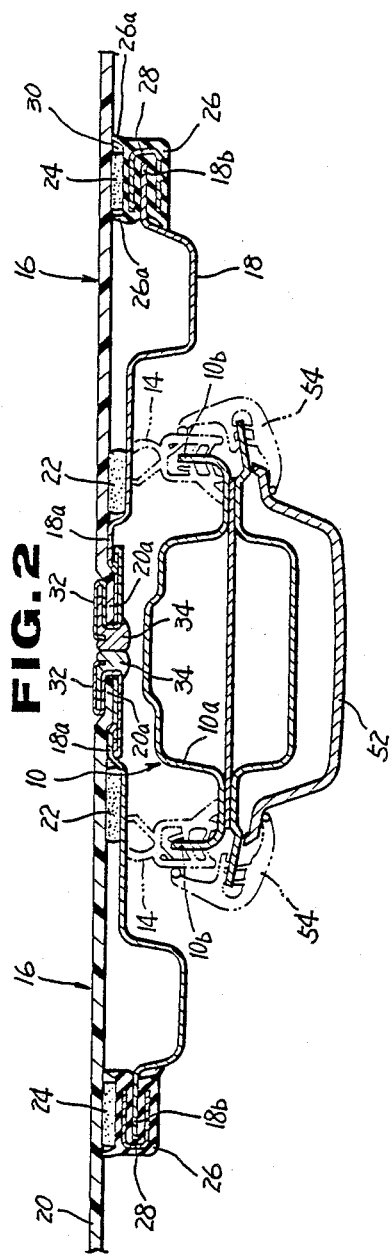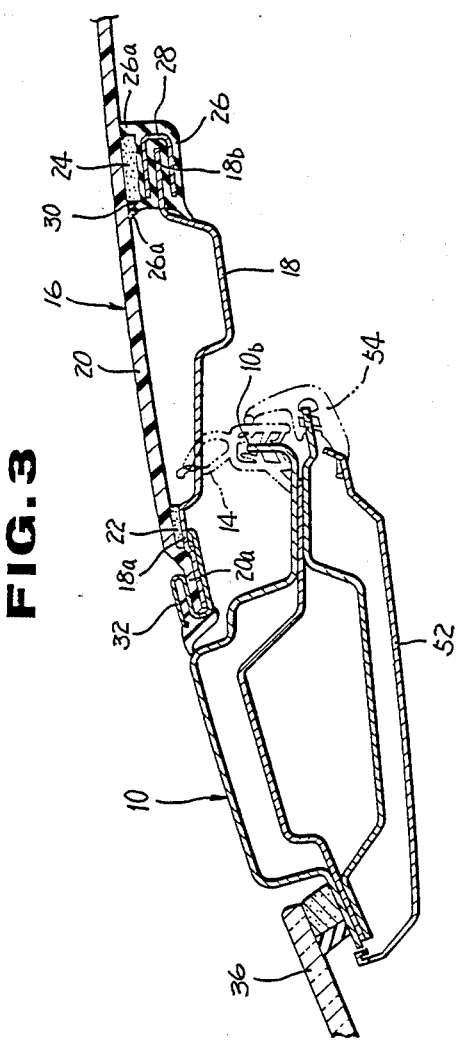

SUNROOF PANEL ASSEMBLY

BACKGROUND OF THE INVENTION

1. Field of the Invention

The present invention relates in general to a roof construction for an automotive vehicle and more particularly to a sunroof panel assembly of a sunroof construction.

2. Description of the Prior Art

A sunroof construction having two detachable sunroof panels made of glass for improving the lighting of the vehicle cabin is known as disclosed in the Japanese Utility Model Publication No. 55-139915. This kind of sunroof construction is also known as a T-bar roof or hatch roof.

The glass sunroof panel needs to be thick in order to have a sufficient strength. The glass sunroof panel is therefore heavy, thus leading to an increased weight of the vehicle body. Further, removal and installation of the glass sunroof panel requires a difficult, laborious work. Still further, the glass sunroof panel has difficulties in its coloring and forming, thus encoutering many design restrictions.

SUMMARY OF THE INVENTION

In accordance with the present invention, there is provided a sunroof panel assembly which comprises an outer panel made of a synthetic resinous material and an inner panel made of metal and in the form of a frame covering the outer peripheral portion of the sunroof panel.

The sunroof panel assembly further comprises a non-curable adhesive bonding the inner panel to the outer peripheral portion of the outer panel, an elastic member provided to at least part of the inner peripheral edge portion of the inner panel, a curable adhesive bonding the elastic member to the outer peripheral portion of the outer panel and clip means for holding the outer peripheral portion of the outer panel and the outer peripheral edge portion of the inner panel tightly together in such way that the outer peripheral edge portion of the inner panel and the outer peripheral portion of the outer panel are slidingly movable relative to each other when there is a thermal expansion differential between the inner panel and the outer panel.

The above structure is effective for overcoming the above noted disadvantages and shortcomings inherent in the prior art glass sunroof panel.

It is accordingly an object of the present invention to provide a novel and improved sunroof panel assembly which is light in weight and has a sufficient strength.

It is another object of the present invention to provide a novel and improved sunroof panel assembly of the above described character of which installation and removal is easy and does not require a difficult, laborious work.

It is a further object of the present invention to provide a novel and improved sunroof panel assembly of the above described character which is free from the above noted difficulties in coloring and forming.

It is a further object of present invention to provide a novel and improved sunroof panel assembly of the above described character which is more difficult to break than the prior art glass sunroof panel in case of collsion, overturn, etc. of the vehicle and therefore more safety than the prior art glass sunroof panel.

BRIEF DESCRIPTION OF THE DRAWINGS

FIGS. 2, 3, 4, and 5 are sectional views taken along the lines II—II, III—III, IV—IV and V—V of FIG. 1.

DESCRIPTION OF THE PREFERRED EMBODIMENT

Figure 1:
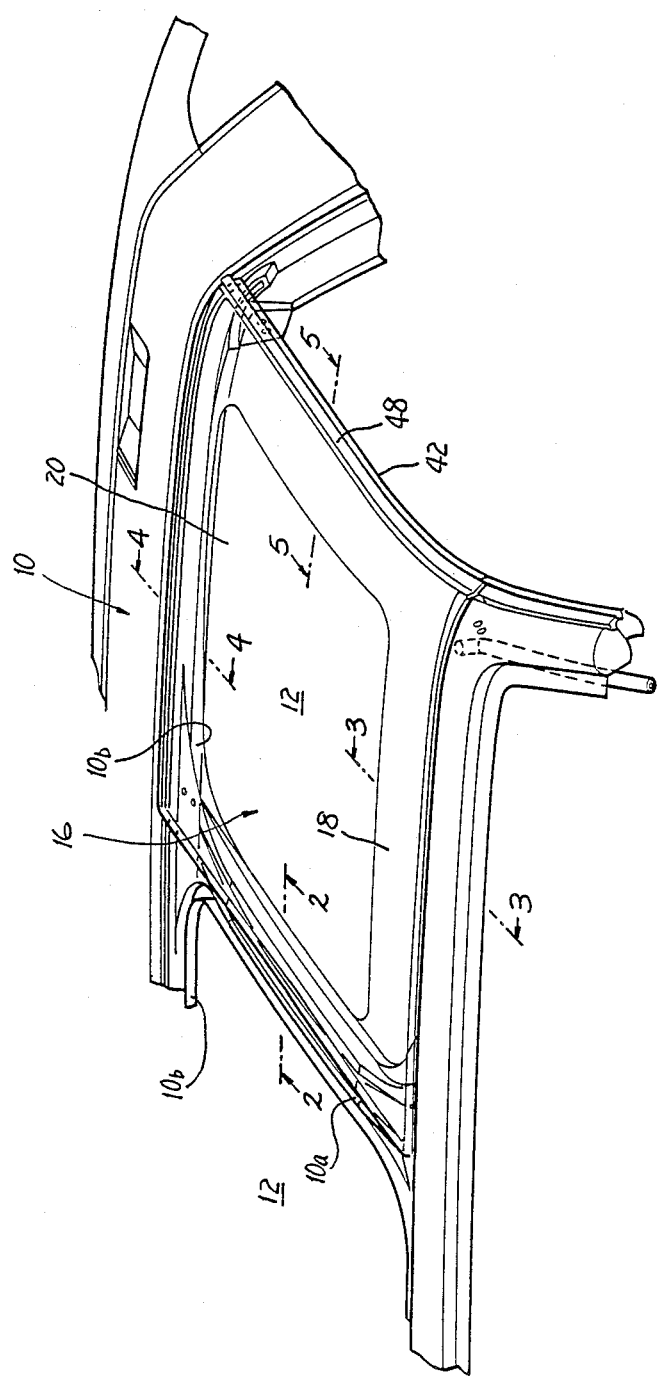
FIG. 1 is a fragmentary perspective view of a sunroof construction incorporating a sunroof panel assembly of an embodiment of the present invention.

Referring to FIGS. 1 to 5, a roof panel 10 is formed with two rectangular openings 12 and 12 which are arranged side by side in the vehicle width direction and separated by a partition roof panel portion 10a elongated in the fore-and-aft direction of the vehicle body. Each edge of the roof panel 10 surrounding each opening 12 is bent into an upstanding flange 10b of a rectangular configuration. A weatherstrip 14 is installed on each flange 10b in such a way as to fittingly contact a sunroof panel assembly 16 to provide a seal between the inside and outside of the vehicle body.

The sunroof panel assembly 16 is installed on the roof panel 10 by, though not shown, a detachable mounting means consisting of brackets projecting from one side of the sunroof panel assembly 16 to releasably engage sockets provided to the front and rear ends of the partition roof panel 10a, lock holes provided to the vehicle body side portions adjacent the front and rear ends of the opening 12 and lock pins projectable from and retractable into the front and rear ends of the sunroof panel assembly 16 to engage and disengage from the lock holes.

The sunroof panel assembly 16 consists of an inner reinforcement frame 18 made of a thin steel sheet and an outer sunroof panel 20 made of a colorless or colored, transparent synthetic resinous material as polycarbonate. The sunroof panel 20 has a rectangular configuration whilst the reinforcement frame 18 has a hollow, correspondingly rectangular configuration. The sunroof panel 20 has an outer peripheral portion 20a bonded to the outer peripheral edge portion 18a of the reinforcement frame 18 by a non-curable adhesive 22 as a pressure-sensitive adhesive. The sunroof panel 20 is also bonded to the inner peripheral edge portion 18b by a curable adhesive 24 as a solvent-sensitive adhesive via an elastic member 26 as a welt fitted to the inner peripheral edge portion 18b of the reinforcement frame 18 for thereby compensating for lack of the strength of the adhesive-bonded joint by the non-curable adhesive. The welt 26 has embedded therein a core metal 28 of a U-like cross section and firmly attached to the inner peripheral edge portion 18b of the reinforcement frame 18. A pair of flexible lips 26a and 26a project upwardly from the opposite sides of the welt 26 to form a space 30 for receiving therein the curable adhesive 24 and thereby preventing the curable adhesive 24 from flowing out of the welt 26 before curing. The outer peripheral portion 20a of the sunroof panel 20 and the outer peripheral edge portion 18a of the reinforcement frame 18 are laid one upon the other and held tightly together by a sunroof panel molding 32. In this connection, it is to be noted that the molding 32 is adapted to clamp or hold the frame 18 and the sunroof panel 20 tightly together in such a way that the outer peripheral edge portion 18a of the frame 18 and the outer peripheral portion 20a of the sunroof panel 20 are slidingly movable relative to each other when there is caused a thermal expansion or contraction differential between the frame 18 and the sunroof panel 20.

Figure 4:
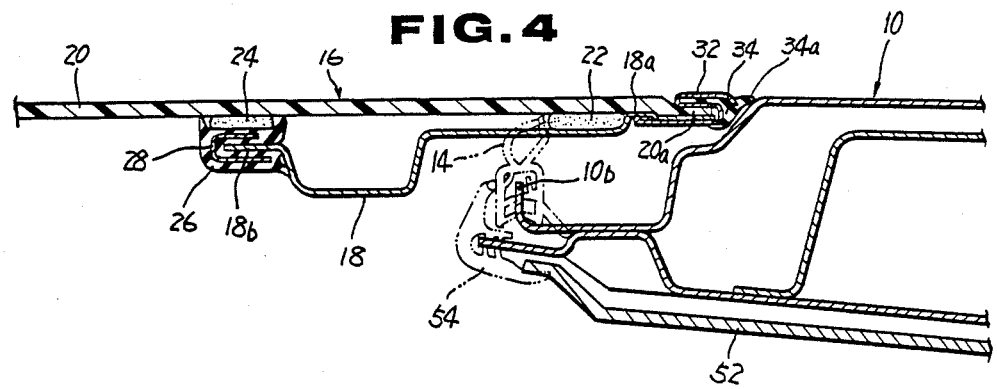

The sunroof panel molding 32 has at the periphery thereof a sealing rubber band 34 which provides a seal between the adjacent sunroof panel assemblies 16 and 16 whilst at the same time joining the same in such a way that the joint between the sunroof panel assemblies 16 and 16 is flush with the adjacent vehicle body surface. Further, each sealing rubber band 34 is formed at the front and rear end portions thereof with a flexible lip 34a, as shown in FIG. 4, which fittingly contact the roof panel 10 to provide a seal therebetween. The lip 34a makes it possible to attain a smooth vehicle body outer surface at the joint between the sunroof panel assembly 16 and the roof panel 10 and therefore a flush-surfaced vehicle body.

Figure 5:
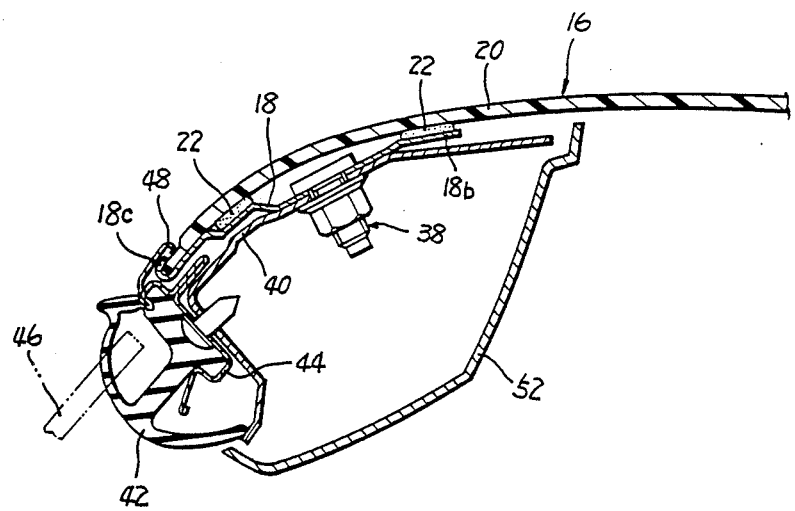

As shown in FIG. 5, the frame 18 has on the side corresponding to a laterally outer side of the sunroof panel 20 a U-like peripheral edge portion 18c for fittingly receiving therein the laterally outer edge of the sunroof panel 20. In this connection, it is to be noted that the inner peripheral edge portion 18b of the frame 18 on the side corresponding to the laterally outer side of the sunroof panel 20 is bonded to the sunroof panel 20 not by a curable adhesive but by a non-curable adhesive 22 so that the inner peripheral edge portion 18b of the frame 18 and the outer peripheral portion 20a of the sunroof panel 20 are slindingly movable relative to each other when there is a thermal expansion or contraction differential between the sunroof panel 20 and the frame 18. The frame 18 has secured thereto by bolts and nuts 38 a roof side frame 40 to which a weatherstrip 42 is attached by means of a retainer 44. The weatherstrip 42 provides a seal between the sunroof panel assembly 16 and an upper end of a door glass 46. The retainer 44 is provided with a molding 48 that covers the joint between the sunroof panel assembly 16 and the weatherstrip 42, whereby it becomes possible to attain a smooth vehicle body outer surface at the vehicle body side portion and therefore a flush-surfaced vehicle body. In the meantime, 36 is a windshield, 52 is a garnish and 54 is a welt attached to the end of the garnish 52.

With the foregoing structure, the sunroof panel 20 of the sunroof panel assembly 16 is made of a synthetic resinous material which is light in weight and the sunroof panel 20 is reinforced by the reinforcement frame 18 made of a thin steel sheet, whereby it becomes possible to reduce the weight without causing lack of strength. Further, there is not substantial restrictions in coloring and forming of the sunroof panel 20 since it is made of a sythetic resinous material, whereby it becomes possible to meet with the various requirements in design of the sunroof panel. In this instance, thermal expansion or contraction of the sunroof panel 20 occurs depending on the temperature causing a thermal expansion of contraction differential between the sunroof panel 20 and the frame 18, i.e., the sunroof panel 20 expands or contacts more than the frame 18 in the direction of extension of its outer surface in response to variations of the atmospheric temperature. Such expansion or contraction of the sunroof panel 20 is compensated for by the elastic deformation of the welt 26 and further by the relative movement between the molding 32 and the outer peripheral edge portion 18a of the frame 18, thus preventing the sunroof panel 20 from being stripped off or separated from the reinforcement frame 18 or being deformed into a waved shape or formed with cracks.

While the sunroof panel assembly has been described and shown as being of a detachable or hatch type, this is not limitative. For example, it may otherwise be of the sliding type.

What is claimed is:

1. A sunroof panel assembly comprising:
   an outer panel made of a synthetic resinous material and having an outer peripheral portion;
   an inner panel made of metal and in the form of a frame covering said outer peripheral portion of said sunroof panel, said inner panel having an inner peripheral edge portion and an outer peripheral edge portion;
   a non-curable adhesive bonding said inner panel to said outer peripheral portion of said outer panel;
   an elastic member provided to at least part of said inner peripheral edge portion of said inner panel;
   a curable adhesive bonding said elastic member to said outer peripheral portion of said outer panel; and
   clip means for holding at least part of said outer peripheral portion of said outer panel and at least part of said outer peripheral edge portion of said inner panel tightly together so that said outer peripheral edge portion of said inner panel and said outer peripheral portion of said outer panel are slidingly movable relative to each other when there is a thermal expansion differential between said inner panel and said outer panel.

2. A sunroof panel assembly as set forth in claim 1 wherein said non-curable adhesive is located at a portion of said inner panel between said inner peripheral edge portion and said outer peripheral edge portion.

3. A sunroof panel assembly as set forth in claim 1 wherein said clip means comprises a molding installed on said outer peripheral portion of said outer panel and said outer peripheral edge portion of said inner panel.

4. A sunroof panel assembly as set forth in claim 3 wherein said molding has at a portion of the outer periphery thereof a sealing rubber band.

5. A sunroof panel assembly as set forth in claim 4 wherein said sealing rubber band has sealing lips at the front and rear ends thereof for contact with a roof panel portion surrounding said sunroof panel assembly.

6. A sunroof panel assembly as set forth in claim 5 wherein said sealing rubber band is contactable at an inner lateral end portion with a sealing rubber band of another sunroof panel assembly.

7. A sunroof panel assembly as set forth in claim 1 wherein said elastic member comprises a welt attached to said inner peripheral edge portion of said inner panel.

8. A sunroof panel assembly as set forth in claim 7 wherein said welt comprises a core metal of a U-like cross section and a pair of flexible lips projecting upwardly from the opposite sides thereof to define a space for receiving therein said curable adhesive.

9. A sunroof panel assembly as set forth in claim 1 wherein said outer peripheral edge portion of said inner panel is partly formed into a U-like shape on the side corresponding to a laterally outer side of said outer panel for receiving therein a laterally outer edge of said outer panel, said inner peripheral edge portion of said inner panel being partly bonded by a non-curable adhesive on the side corresponding to said laterally outer side of said outer panel.

10. A sunroof panel assembly as set forth in claim 9, further comprising a weatherstrip secured to said inner panel in such a way as to be located on said laterally outer side of said outer panel for contact with an upper end of a door glass.

11. A sunroof panel assembly as set forth in claim 10, further comprising a molding at the joint between said weatherstrip and said outer panel.

12. A sunroof panel assembly as set forth in claim 1 wherein said inner panel is made of a thin steel sheet.

* * * * *